Aug. 3, 1954 L. C. ATWOOD ET AL 2,685,452
BICYCLE KICK STAND
Filed Nov. 22, 1950
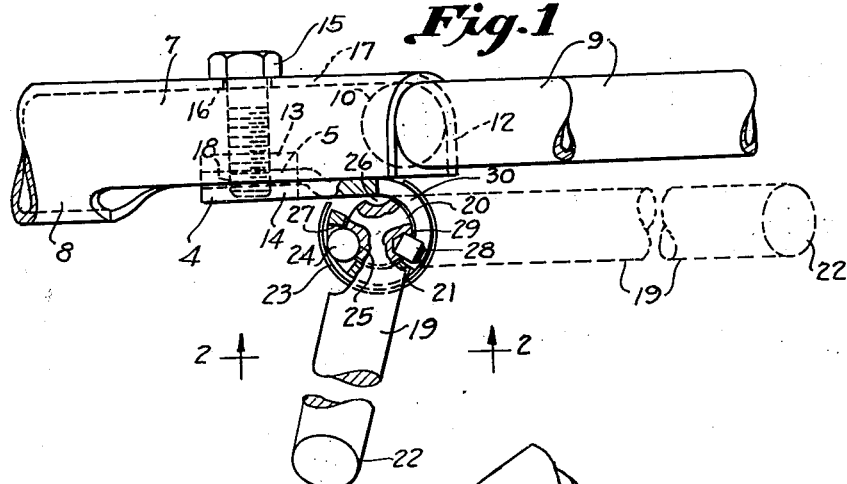
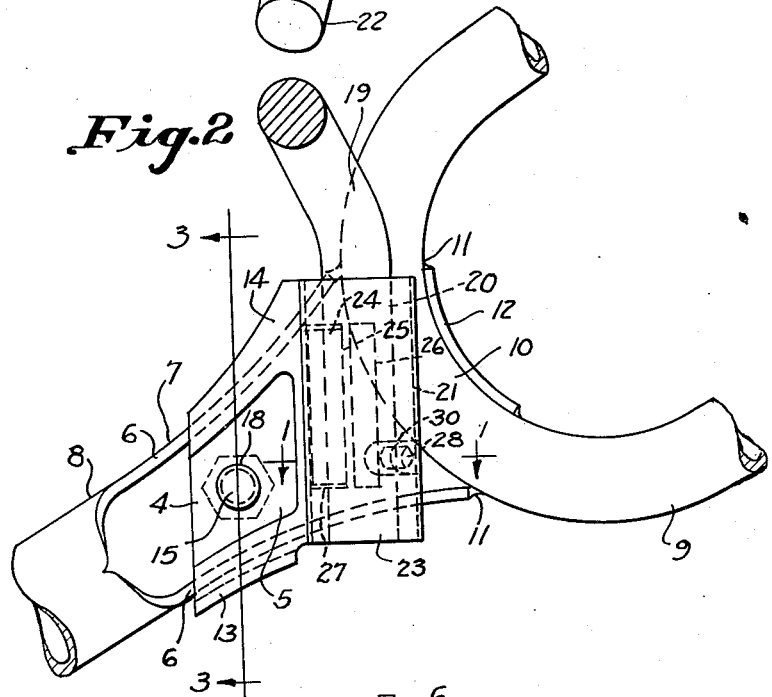
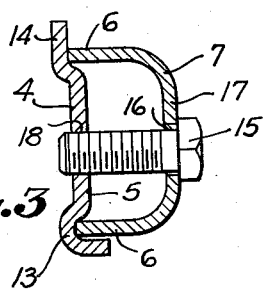
INVENTORS
LYLE C. ATWOOD
BY AGNAR JOHNSON
ATTY Patented Aug. 3, 1954

2,685,452

UNITED STATES PATENT OFFICE 2,685,452

BICYCLE KICK STAND

Lyle C. Atwood and Agnar Johnson, Rockford, Ill., assignors to Atwood Vacuum Machine Company, Rockford, Ill., a corporation of Illinois Application November 22, 1950, Serial No. 197,022

1 Claim. (Cl. 280—301)

This invention relates to bicycle kick stands and is more specifically concerned with improvements applicable to a stand of the type disclosed in the copending application of Lyle C. Atwood and Howard W. Clay, Serial No. 54,744, filed October 15, 1948, which resulted in Patent No. 2,615,729, issued October 28, 1952.

In the kick stand of said copending application a longitudinally split sleeve spring, called a C-spring because of its C-shaped cross-section, surrounds a horizontally disposed journal bearing in which the swingable supporting arm or leg is mounted for oscillation between its horizontal retracted position and its downwardly extended operative position, and cooperates with an elongated detent pin extending lengthwise of the bearing in a slot provided in the wall thereof to urge the pin inwardly in a radial direction relative to said bearing to engage selectively in either of two circumferentially spaced detent grooves or recesses provided in the journal end portion of the supporting leg entered in said bearing, the said grooves being just deep enough in relation to the pressure exerted by said spring so that said leg provides a reliable support for the bicycle in its extended operative position, while, on the other hand, there is sufficient leverage with the supporting leg in relation to the holding force of the spring and detent pin to permit disengaging the pin from the groove and moving it with reasonably light foot pressure from one extreme position to the other. Although that construction operates quite satisfactorily under the average conditions there is the objection that the stand is apt to collapse and let the bicycle fall over if the C-spring is overloaded, as occurs for example, when a bicycle used by a newsboy carries a heavy load of newspapers on the rear luggage carrier. It is, therefore, the principal object of our invention to provide a kick stand of the kind just described operable with the same ease and convenience as the earlier design but incorporating a stop pin for positively limiting the pivotal movement of the supporting leg regardless of overloading, whereby to prevent collapse of the stand.

The invention is illustrated in the accompanying drawing, in which—

Fig. 1 is a side view of a kick stand made in accordance with our invention, shown applied to a bicycle frame, a portion of the supporting leg being broken off to save space and permit showing the device on a larger scale, and portions of the bearing and journal entered therein being shown in section on line 1—1 of Fig. 2 to better illustrate the construction and indicate the mode of operation;

Fig. 2 is a bottom view taken on line 2—2 of Fig. 1, and

Fig. 3 is a cross-section on line 3—3 of Fig. 2.

The same reference numerals are applied to corresponding parts in these three views.

Referring to the drawing, the reference numeral 4 designates a stamped sheet metal attaching plate or bracket forming a part of our improved kick stand, the same having a dovetail-shaped embossed central portion 5 which fits neatly and without freedom to turn between the rearwardly diverging walls 6 of the channel shaped rear portion 7 of the bicycle frame member 8. The latter extends rearwardly from the usual hanger bearing on the lower central portion of the bicycle frame and is connected to the horizontal rear fork 9. The front cross-portion 10 of this fork is welded, as indicated at 11, in the cross-head portion 12 formed on the rear widened end of the channel shaped portion 7 of frame member 8. To further insure rigid attachment of the plate 4 on this frame, a channel 13 is formed on one marginal edge portion of the plate in which the edge of one side wall 6 is received. The other edge portion 14 of the plate is left flat for abutment with the edge of the other side wall 6. With this plate 4 so formed, a single fastening bolt 15 is sufficient to anchor the plate firmly to the frame. This bolt is passed freely through a hole 16 in the web portion 17 of channel 7 and threaded in a hole 18 provided in the center of the embossed portion 5 of the plate. The head of this bolt is, therefore, conveniently located for tightening with a wrench, and only the one tool is needed in the application of the kick stand to the bicycle.

The supporting leg 19 for propping the bicycle is made from cylindrical rod material bent to the required generally L-shape, providing a journal 20 on the inwardly directed transversely extending pivotal end portion for oscillation in the bearing 21 formed by the cylindrical curled end of the plate 4. This bearing 21 is in acute angle relationship to the frame member 8, as appears in Fig. 2, so as to locate the outwardly directed transversely extending ground engaging end portion 22 of leg 19 far enough away from the bicycle for good support when the leg is turned through nearly 120° from a nearly horizontal retracted position indicated in dotted lines in Fig. 1, wherein it is nearly parallel to and alongside the bicycle rear fork 9, in the usual way, to the operative position shown in full lines in Fig. 1. The bearing 21 is of ample length and the journal 20 extends the full length thereof so that the unit bearing pressure in this construction is reduced far below what has been common for devices of this kind in the past. The bearing 20 is rather tightly enclosed by a split sleeve spring 23 substantially its full length, and this spring, sometimes referred to as a C-spring, because of its C-shaped cross-section, serves to press a cylindrical detent pin 24 into whichever one of two rounded grooves 25 and 26 in the journal 20 is brought into register with the slot 27 in the bearing 21, the pin 24 being caged in said slot and having an easy working fit therein. The pin 24 causes the spring 23 to be spread to an appreciable extent when the pin is seated in either of the grooves 25 and 26, as appears in Fig. 1, but when the leg 19 is turned to turn the journal 21 and accordingly force the pin 24 to ride out of the groove the spring is spread much more, as must be clear from a study of Fig. 1, and hence the spring is loaded enough so that it will snap the pin back into the other groove under heavier spring pressure as soon as that groove comes into register with the slot. The slot 27 terminates short of the ends of the bearing 20, as appears in Fig. 2, and the pin 24 is slightly shorter than the slot so that it will work freely therein. The grooves 25 and 26 are circumferentially spaced about 120°, more or less, and are so related to the leg 19 so that when pin 24 is seated in groove 26 the leg is supported releasably in the raised, substantially horizontal retracted position indicated in dotted lines in Fig. 1, and when pin 24 is seated in groove 25 the leg is supported in the lowered operative position shown in full lines in Fig. 1. The groove 25 should be and preferably is a trifle deeper than groove 26 inasmuch as there is no strain upon the leg 19 in raised position whereas the leg 19 assumes the load incident to propping the bicycle when in its operative position. However, both grooves are just deep enough in relation to the pressure exerted by spring 23 so that the leg 19 provides a reliable support in the operative position, while, on the other hand, they are shallow enough in relation to the spring pressure of spring 23 and the leverage afforded by leg 19 in turning the same from one extreme position to the other so that it can be moved one way or the other with reasonably light foot or hand pressure. The journal 20 and bearing 21 as thus far described are the same as in the copending application.

In accordance with our invention the leg 19 is provided with a positive stop to limit its pivotal movement relative to bearing 21 so that when the leg 19 is extended downwardly to prop a bicycle there will be no danger of the bicycle being allowed to fall over because the leg, when overloaded, collapsed. A stop pin 28 is inserted in a radial hole 29 provided in the journal 20 and projects into an elongated arcuate slot 30 provided in the wall of bearing 21. The slot 30 extends through approximately 120°, corresponding to the 120° spacing of grooves 25 and 26. The pin 28 is so spaced circumferentially relative to grooves 25 and 26, and the slot 30 is so spaced circumferentially relative to slot 27, that when detent pin 24 is engaged in groove 25, the stop pin 28 is disposed at one end of slot 30, as shown in Fig. 1, and, when detent pin 24 is engaged in groove 26, stop pin 28 is disposed at the other end of slot 30. Consequently, leg 19 cannot collapse and let the bicycle fall over, regardless of an overload. Then too, one cannot force the leg 19 upwardly past its normal retracted position. The pin 28, being disposed in a plane intermediate the ends of the journal 20 and C-spring 23, need have only a close or working fit in the hole 29, as distinguished from a drive or press fit, because spring 23 will prevent the pin 28 from becoming displaced from the hole. The construction is also of advantage from the standpoint that the slot 30 is protected by spring 23 against entry of dirt, and the spring gives the device a nicer external appearance, because all of the unsightly parts are enclosed.

It is believed the foregoing description conveys a good understanding of the objects and advantages of our invention. The appended claim has been drawn to cover all legitimate modifications and adaptations.

We claim:

In a bicycle kick stand comprising a tubular bearing of rigid construction, a supporting leg having an angularly extending cylindrical end portion fitting in said bearing as a journal, said bearing having a longitudinal slot provided therein and said journal having circumferentially spaced longitudinal grooves provided therein arranged to register with said slot in different positions of angular adjustment of said supporting leg relative to said bearing, and a split sleeve spring tightly enclosing more than half of said bearing, measured circumferentially, pressing a detent element inwardly in said slot toward engagement in whichever groove is in register with said slot, the improvement which consists in the provision of an elongated circumferentially extending slot in said bearing covered by said sleeve spring for protection of the bearing against entry of foreign matter through said last named slot, said journal having a radially extending hole provided therein, and a stop pin inserted in said hole and projecting radially therefrom into said elongated slot and arranged to engage one or the other end thereof when the supporting leg is in one or the other of its positions of angular adjustment, said sleeve spring being disposed in closely radially spaced relation to the outer end of said pin and serving to prevent displacement of said pin from said hole.

References Cited in the file of this patent

UNITED STATES PATENTS

| Number | Name | Date |
|---|---|---|
| 2,268,051 | Miller | Dec. 30, 1941 |
| 2,395,148 | Schwinn | Feb. 19, 1946 |
| 2,456,536 | Schwinn | Dec. 14, 1948 |
| 2,496,593 | Morgan | Feb. 7, 1950 |